No. 736,730. Patented August 18, 1903.

UNITED STATES PATENT OFFICE.

GERHARD HOYERMANN, OF HANOVER, GERMANY.

PROCESS OF RENDERING THE PHOSPHORIC ACID IN NATURAL PHOSPHATES SOLUBLE IN CITRIC ACID.

SPECIFICATION forming part of Letters Patent No. 736,730, dated August 18, 1903.

Application filed June 11, 1902. Serial No. 111,185. (No specimens.)

*To all whom it may concern:*

Be it known that I, GERHARD HOYERMANN, a subject of the Emperor of Germany, residing at 50 Königstrasse, Hanover, in the German Empire, have invented a new and Improved Process of Rendering the Phosphoric Acid Contained in Natural Phosphates Soluble in Citric Acid, of which the following is a specification.

This invention relates to a process for rendering the phosphoric acid contained in raw phosphates soluble in citric acid.

It is well known that phosphoric acid as contained in natural phosphates of lime or so-called "raw phosphates" is ineffective as a manure by reason of its unassimilable or almost unassimilable condition, while the phosphoric acid contained in Thomas meal is readily assimilated. The condition of the phosphoric acid contained in natural phosphates and that contained in Thomas meal differs so much from each other that while the latter is soluble in a two-per-cent. solution of citric acid the former is insoluble therein.

The object of this invention is to render the phosphoric acid contained in the natural phosphates likewise soluble in a two-per-cent. solution of citric acid and by a simple and easy process to convert it into a condition in which it is as readily assimilated by plants as that contained in Thomas meal. For this purpose finely-ground natural phosphate is treated with a quantity of a suitable acid sufficiently small that the by-ingredients—such as lime, magnesia, &c.—which exist in the material in the form of carbonates, silicates, &c., but not the tricalcium phosphate itself, are decomposed. The acid employed may consist of sulfuric acid, hydrochloric acid, nitric acid, phosphoric acid, and the like or a mixture of these acids, or the natural phosphate may be mixed with salts of these acids and then formed into their acids within the mixture by the addition of a suitable acid—as, for instance, sulfuric acid.

The process is best carried out by diluting the acids or the mixtures of them with water and then mixing them with the finely-ground natural phosphate. The mass is afterward dried. The phosphoric acid is thereby brought into a condition in which, as is the case with the phosphoric acid in Thomas meal, it is soluble in a two-per-cent. solution of citric acid. The quantity of water to be added to the acids should be such as to produce a uniform admixture with the raw phosphates.

The following examples illustrate the workings of my improved process:

(*a*) *By means of sulfuric acid.* — One thousand kilograms of a natural phosphate which contains sixty-eight per cent. of tricalcic phosphate or thirty-one per cent. of unsoluble phosphoric acid are mixed with three hundred kilograms of the so-called "chamber" sulfuric acid of 50° Baumé and three hundred kilograms water. This quantity of water is sufficient to decompose the carbonates, silicic and fluor combinations contained in the phosphate, whereas the manufacture of superphosphate would require eleven hundred kilograms sulfuric acid of 50° Baumé. The mixture, of a paste-like consistence, is piled in a heap and kept until it is thus dried as to be caused to be sieved. The product thus obtained has a weight of fifteen hundred kilograms, a water contents of twenty-six per cent., a contents of phosphoric acid of 20.43 per cent., of which 15.84 per cent. is soluble in citric acid. After further drying, the water contents are 20.16 per cent., the contents of phosphoric acid twenty-two per cent., of which 17.76 per cent.—*i. e.*, eighty per cent. of the entire phosphoric acid—is soluble in citric acid.

(*b*) *By means of a mixture of sulfuric acid and hydrochloric acid.*—One thousand kilograms of the same phosphate are mixed and treated with two hundred and fifty kilograms sulfuric acid of 50° Baumé, two hundred kilograms water, and one hundred kilograms of a twenty-five-per-cent. hydrochloric acid in the same manner as before described. The product contains 25.5 per cent. water and 21.43 per cent. phosphoric acid, of which 17.84 per cent., or 83.6 per cent. of the entire quantity of phosphoric acid, is soluble in water.

The process differs from that already known for producing superphosphate by means of sulfuric acid, inasmuch as in the superphosphate process so much acid is used that all of the tricalcium phosphate is decomposed into phosphoric acid soluble in water. The difference in the two processes is clearly explained in the following example: It is necessary to employ for the production of superphosphate from the ordinary natural phosphates about one hundred per cent. sulfuric of 50° Baumé, while by the present process the condition of solubility in citric acid is produced in the natural phosphate by the employment of only ten per cent. to thirty per cent. sulfuric acid of 50° Baumé.

The quantity of acid to be added in order to bring about the desired result depends on the proportions of the other ingredients in the natural phosphates, such as the carbonates, silicates, &c.

The present process is also applicable to the treatment of natural phosphates which are mixed with other manures, such as ammonia or potassium salts or niter.

Having now particularly described and ascertained the nature of my said invention and in what manner the same is to be performed, I declare that what I claim is—

1. The process for rendering the phosphoric acid contained in natural phosphates soluble in citric acid, which consists in treating one hundred parts of the natural phosphate with approximately thirty parts of acid to decompose its by-ingredients.

2. The process for rendering the phosphoric acid contained in natural phosphates soluble in citric acid, which consists in treating one hundred parts of finely-ground natural phosphate with approximately thirty parts of acid diluted in any desired manner to decompose the by-ingredients of said natural phosphate.

3. The process for rendering the phosphoric acid contained in natural phosphates soluble in citric acid, which consists in treating one hundred parts of finely-ground natural phosphate with approximately thirty parts of acid diluted in any desired manner to decompose the by-ingredients of said natural phosphate, and then drying the mass thus obtained, so as to adapt it to be sieved.

4. The process for rendering phosphoric acid contained in natural phosphates soluble in citric acid, which consists in treating one hundred parts of a natural phosphate with a solution of three hundred parts of sulfuric acid and three hundred parts of water, for the purpose specified.

In witness whereof I have hereunto set my hand in presence of two witnesses.

GERHARD HOYERMANN.

Witnesses:
LEONORE RASCH,
C. C. STEVENSON.